3,314,921
CHEMICAL PROCESS AND PRODUCT
Glenn A. Berchtold, Watertown, Mass., assignor to E. I. du Pont de Nemours and Company, Wilmington, Del., a corporation of Delaware
No Drawing. Filed Aug. 21, 1961, Ser. No. 132,573
7 Claims. (Cl. 260—77.5)

This invention relates to novel compositions and more particularly to polyenamines having amide and/or thioamide links incorporated therein.

It is an object of the present invention to provide new polymers. A further object is to provide polyenamines which contain amide and/or thioamide links incorporated therein. A still further object is to provide a process for preparing these polymers by reacting a monoenamine with a monomeric organic diisocyanate or diisothiocyanate. Other objects will appear hereinafter.

These and other objects of this invention are accomplished by providing polyenamines having the structures (a)

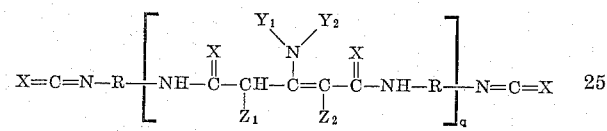

(b)

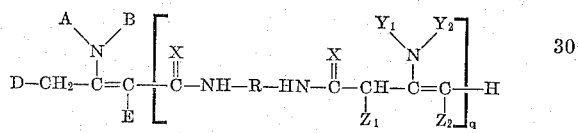

and (c)

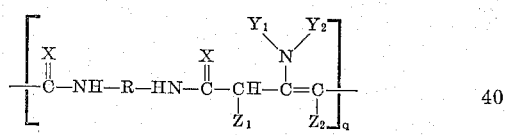

where $Y_1$, $Y_2$, $Z_1$, and $Z_2$, which can be the same or different, are hydrocarbon or substituted hydrocarbon radicals, inert toward isocyanates and enamines; X is S or O; R is a bivalent non-polymeric organic radical inert toward isocyanates and enamines; q is a positive integer; with the provisos that (a) $Y_1$ is joined to the nitrogen atom bearing $Y_2$ through a primary or secondary aliphatic carbon atom; (b) at least one of the pairs $Y_1$, $Y_2$, $Z_1$, and $Z_2$ joined together, said junctions being made directly or through a hetero-atom (S, O or tertiary N having a hydrocarbon radical attached thereto) to form a 5 to 7 membered ring and (c) any aliphatic carbon atom joining $Y_2$ to the nitrogen atom bearing $Y_1$ is primary or secondary. In particular, $Y_1$, $Y_2$, $Z_1$, and $Z_2$ can be aliphatic, aromatic, aromatic-substituted aliphatic, and aliphatic-substituted aromatic hydrocarbon radicals. In turn, these radicals can bear non-hydrocarbon substituents unreactive toward enamines and isocyanates; representative examples include nitro, alkoxy, aryloxy, thioalkoxy, and thioaryloxy groups.

Representative examples of compounds within the scope of the present invention include:

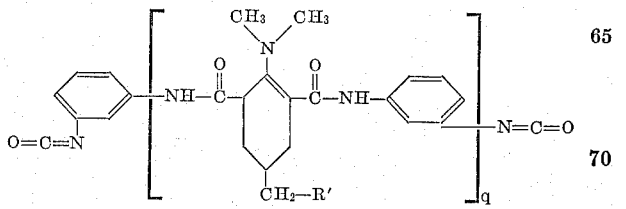

where R' is phenyl;

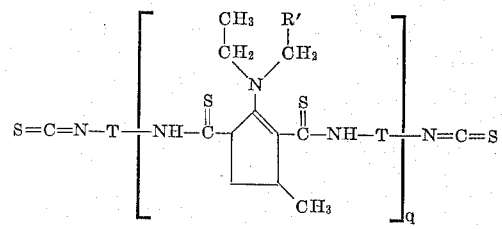

where R' is phenyl and T is

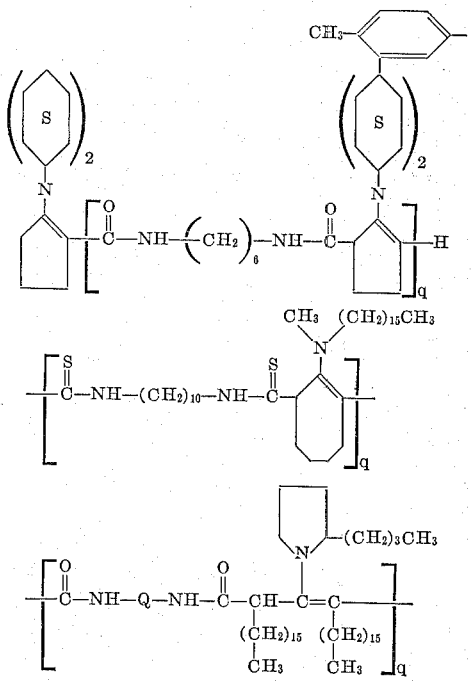

where Q is

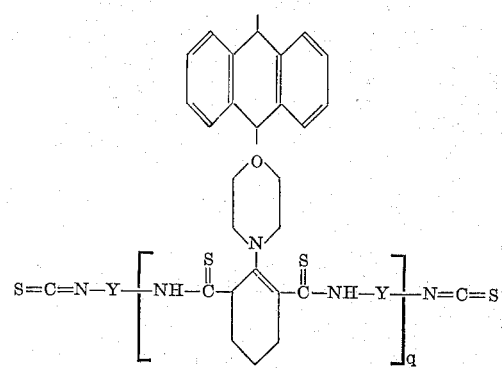

where Y is

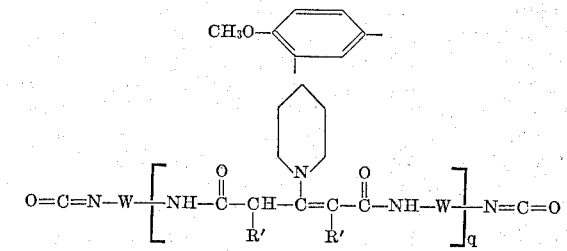

where R' is phenyl and W is

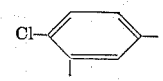

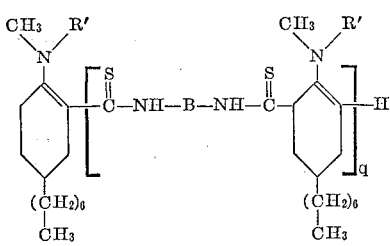

where R′ is phenyl and B is

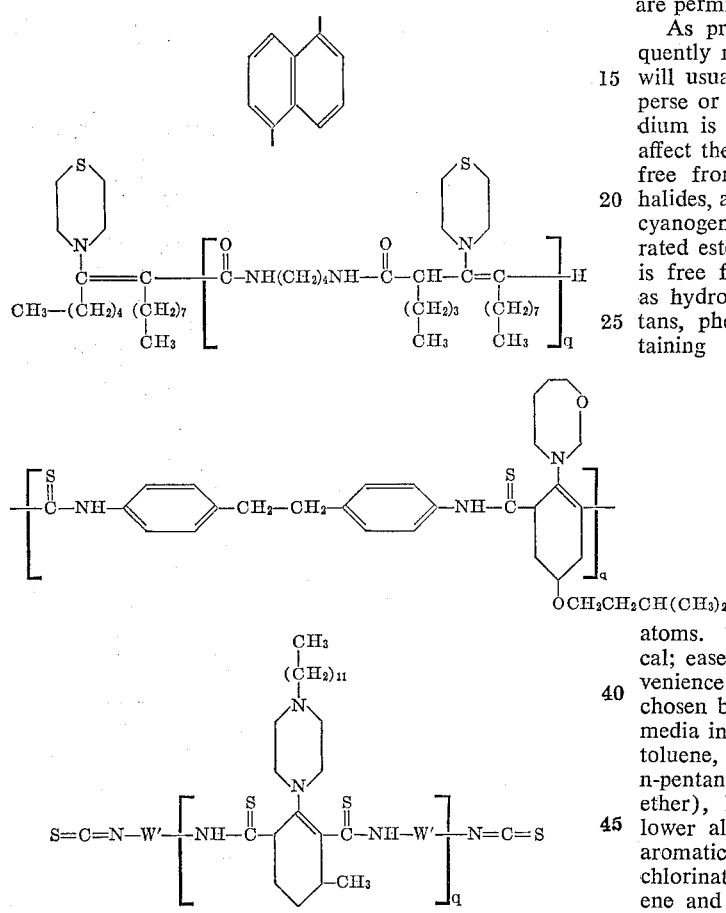

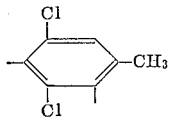

where W′=

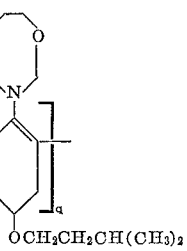

The polyenamines of the present invention are made by reacting an organic diisocyanate (or diisothiocyanate) with a monoenamine. A solvent is often employed for operating convenience, although its use is optical. Addition of reactants can be made in any order, at one time, or intermittently or continuously. Enamine reactable or isocyanate-reactable impurities should be excluded.

The reaction temperaure is not critical and can range from room temperature (20-30° C.) to about 160° C., 80 to 100° C. frequently being preferred. For a particular set of reactants, the reaction time required can be shortened by raising the temperature. Representative periods range from 1 to 48 hours.

Those skilled in the art can empirically determine the proportions of reactants needed to obtain the polyenamine desired for a particular purpose. When equimolar proportions of reactants are employed, very high molecular weight polyenamines having repeating units of structure (c) above result. When excess molar proportions of an enamine are used, enamine-terminated polyenamines (structure (b) above) are formed having molecular weights generally lower than polymers of structure (c). For this purpose, the mole ratio of enamine to diisocyanate (or diisothiocyanate) will range at least as high as 2:1; higher values are permissible. When excess molar proportions of a diisocyanate (or diisothiocyanate) are supplied, NCO-terminated polyenamines (structure (a) above) result having molecular weights generally lower than polymers of structure (c). For this purpose, the mole ratio of diisocyanate (or diisothiocyanate) to enamine will include values as high as 2:1; higher values are permissible.

As previously mentioned, the polyenamines are frequently made in an inert liquid medium. This medium will usually dissolve the reactants; it may dissolve, disperse or swell the polyenamines as well. This inert medium is "inert" in the sense that it does not adversely affect the desired course of reaction; thus the medium is free from enamine-reactable compounds such as acyl halides, alkyl halides, allylic halides, benzyl halides, water, cyanogen chloride, $\alpha,\beta$-unsaturated nitriles, $\alpha,\beta$-unsaturated esters, and $\alpha,\beta$-unsaturated ketones; furthermore, it is free from —N=C=X— reactable compounds such as hydrogen sulfide, alcohols, carboxylic acids, mercaptans, phenols, thiophenols, and other compounds containing groups bearing Zerewitinoff-active hydrogen atoms. The total concentration of reactants is not critical; ease of stirring and other factors of operating convenience will determine the maximum concentration chosen by those skilled in the art. Representative inert media include: aromatic hydrocarbons (such as benzene, toluene, and m-xylene), aliphatic hydrocarbons (such as n-pentane), aliphatic acyclic ethers (such as diethyl ether), heterocyclic ethers (such as tetrahydrofuran), lower alkyl esters (such as ethyl acetate), chlorinated aromatic hydrocarbons (such as o-dichlorobenzene), chlorinated vinyl hydrocarbons (such as trichloroethylene and tetrachloroethylene); and dimethyl formamide. Mixtures of two or more miscible liquids (such as tetrahydrofuran/dimethylformamide) can be employed when desired. The polyenamines can be isolated by conventional means. Precipitates can be collected by filtration or centrifugation. The soluble product can, when desired, be freed from solvent by evaporation, spray drying, or by admixture with non-solvents. For some applications, such as coatings, it is convenient to use a solution of the polyenamines.

The enamines used in making the polymers of the present invention have the structure

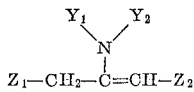

where $Y_1$, $Y_2$, $Z_1$, and $Z_2$, which may be the same or different, are hydrocarbon or substituted hydrocarbon radicals, preferably from about 1 to 18 carbon atoms, inert toward isocyanates and enamines, with the provisos that (a) $Y_1$ is joined to the nitrogen atom bearing $Y_2$ through a primary or secondary aliphatic carbon atom; (b) at least one of the pairs $Y_1$, $Y_2$, $Z_1$, and $Z_2$ is joined directly or through a heteroatom (S, O, or tertiary nitrogen having a hydrocarbon radical attached thereto) to form a 5 to 7 membered ring; (c) any aliphatic carbon atom in $Y_2$ joining $Y_2$ to the nitrogen atom bearing $Y_1$ is primary or secondary. Thus, $Y_1$, $Y_2$, $Z_1$, and $Z_2$ can be aliphatic (e.g. lower alkyl) and aromatic substituted aliphatic (e.g. benzyl) hydrocarbon radicals. $Y_2$, $Z_1$, and $Z_2$ can also be aromatic (e.g. phenyl, naphthyl, or biphenylyl) or aliphatic substituted aromatic hydrocarbon radicals (e.g. xylyl, tolyl). In addition, $Y_1$, $Y_2$, $Z_1$, and $Z_2$ can bear non-hydrocarbon substituents unreactive toward isocyanates and enamines. Representative examples of suitable substituents include alkoxy, aryloxy, thioalkoxy, thioaryloxy, and nitro. Groups bearing Zerewitinoff-active hydrogen atoms are absent.

Representative examples of these enamines include:
N,N-diethyl-1-cyclopenten-1-ylamine;
4-ethyl-N,3-dimethyl-N-isopropyl-1-cyclopenten-1-ylamine;
N-butyl-3-tert-butyl-N-propyl-1-cyclopenten-1-ylamine;
N,N-diisoamyl-3-cyclopentyl-1-cyclopenten-1-ylamine;
N-ethyl-N-cyclohexyl-3,4-diphenyl-1-cyclopenten-1-ylamine;
N-methyl-N-(α-phenethyl)-1-cyclohexen-1-ylamine;
N-ethyl-3-methyl-N-(2-naphthyl)-1-cyclohexen-1-ylamine;
1-(N-methyl-o-chloroanilino)-3-tert-butyl-4,4-dimethyl-1-cyclohexene;
1-(N-isoamylanilino)-4-methoxy-1-cyclohexene;
1-(2-penten-3-yl)-piperidine;
1-(3-hepten-3-yl)-3-methyl-piperidine;
3-isopropyl-1-(1-ethyl-1-isopentyl-1-yl)-piperidine;
1-(3-nonen-3-yl)-3-phenyl-piperidine;
2-benzyl-1-(3-hepten-4-yl)-piperidine;
4,4-dimethyl-3-phenyl-1-(6-methyl-3-hepten-3-yl)-piperidine;
3-(4-octen-4-yl)-oxazolidine;
2,4-dimethyl-3-(4-nonen-4-yl)-oxazolidine;
3-(4-hendecen-4-yl)-5-phenyl-oxazolidine;
1-(7-pentadecen-8-yl)-pyrrolidine;
2-n-butyl-1-(8-heptadecen-9-yl)-pyrrolidine;
3-ethyl-1-(6-dodecen-6-yl)-4-phenyl-pyrrolidine;
1-(7-hexadecen-7-yl)-4-methyl-piperazine;
1-(6-pentadecen-6-yl)-hexamethyleneimine;
4-(71hexadecen-7-yl)-morpholine;
1-(10-heneicosen-11-yl)-triamorpholine;
4-(13-heptacosen-14-yl)-homomorpholine;
2,6-dimethyl-1-(17-pentatriaconten-18-yl)-morpholine;
1-(1-cyclopenten-1-yl)-piperidine;
2-methyl-1-(3-propyl-1-cyclopenten-1-yl)-piperidine;
2,5-diethyl-1-(3-tert-butyl-1-cyclopenten-1-yl)-piperidine;
2-(p-chlorophenyl)-1-(1-cyclohexen-1-yl)-piperidine;
2-(7-methoxyheptyl)-1-(3-benzyl-1-cyclohexen-1-yl)-piperidine;
3-(3-phenylpropyl)-1-(4-amyloxy-1-cyclohexen-1-yl)-piperidine;
2-methyl-3-(4-heptyl-1-cyclohexen-1-yl)-oxazolidine;
3,3-diphenyl-1-(5-ethyl-3-methyl-1-cyclohexen-1-yl)-pyrrolidine;
2-methyl-1-(1-cyclopenten-1-yl)-hexamethyleneimine;
4-(1-cyclohepten-1-yl) morpholine;
5-ethyl-4(1-cyclohexen-1-yl)-2-methyl morpholine;
4-(3-propyl-1-cyclopenten-1-yl)-thiamorpholine;
4-(4-methyl-1-cyclohexen-1-yl)-homomorpholine;
6-methyl-3(2-penten-3-yl)-4-isopropyl-tetrahydro-1,3-oxazine;
4-dodecyl-1-(1-cyclopenten-1-yl)-piperazine; and
4-(phenyl)-1-(1-cyclohexen-1-yl)-piperazine.

The enamines used in preparing the polymers of the present invention can be made by reacting a ketone

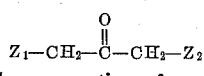

with at least a molar proportion of a secondary amine

where $Y_1$, $Y_2$, $Z_1$, and $Z_2$ have the same meanings previously stated. Frequently about 1.5 to 2 molar proportions of amine are employed. Preferably the condensation is carried out in an inert water-immiscible solvent. By "inert" is meant a solvent which will not affect the desired course of reaction; thus the medium is free from enamine-reactable compounds such as alkyl halides, allylic halides, acyl halides, benzyl halides, water, cyanogen chloride, α,β-unsaturated nitriles, α-β-unsaturated ketones, and α,β-unsaturated esters; furthemroe, it is free of acid functions which would tie up the amine and of groups which might tie up the ketone, e.g. vicinal glycols which could form ketals. Aliphatic and aromatic hydrocarbons are preferred, benzene and toluene being particularly preferred. The concentration of reactants is not critical. Frequently about 10–70 grams of reactants are employed for every 100 milliliters of solvent. A catalyst is optional; occasionally 0.05–5 grams of p-toluene sulfonic acid are added for every gram-mole of ketone. The reaction temperature is not critical; temperatures between about 80 and 120° C. are often very satisfactory. The progress of the reaction can be followed by measuring the amount of water which is formed. The reaction time needed will frequently range between about 10 to 300 hours, 10–50 often sufficing. The lower the temperature and the more sterically hindered the reactants, the longer the time. In a representative procedure a solution of 30 grams of cyclopentanone and 46.5 grams of morpholine in 300 milliliters of toluene are refluxed at atmospheric pressure under a water separator (e.g. Dean-Starke tube) for 20–30 hours. The solvent is then removed by distillation at atmospheric pressure and the residue fractionated through a Vigreux column. Examples of preparations of this type are given in the Ph. D. Thesis of A. A. Brizzolara (Columbia University, 1960). Enamines can be made by the method described in U.S. Patent 2,773,087. The procedures disclosed in Methoden der Organischen Chemie, Houben-Weyl, vol. II (Stickstoff verbindungen), page 171, are also useful.

Any organic diisocyanate, $R(NCO)_2$, free from enamine-reactable substituents can be used in making the compounds of the present invention. The radical R in the above structures is derived from this reactant. These diisocyanates are to be monomeric (or non-polymeric) and have molecular weights below about 500, with a preferred molecular weight of not greater than 300. In general, these diisocyanates have not more than about 25 carbon atoms. Representative diisocyanates include toluene-2,4-diisocyanate,
1,6-hexamethylenediisocyanate,
1,4-tetramethylenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4′-diisocyanatodiphenylether,
5,6-dimethyl-1,3-phenylenediisocyanate,
2,4-dimethyl-1,3-phenylenediisocyanate,
4,4′-diisocyanatodiphenylether,
benzidinediisocyanate,
4,6-dimethyl-1,3-phenylenediisocyanate,
9,10-anthracenediisocyanate,
4,4′-diisocyanatodibenzyl,
3,3-dimethyl-4,4′-diisocyanatodiphenylmethane,
2,6-dimethyl-4,4′-diisocyanatodiphenyl,
2,4-diisocyanatostilbene,
3,3′-dimethyl-4,4′-diisocyanatodiphenyl,
3,3′-dimethoxy-4,4′-diisocyanatodiphenyl,
1,4-anthracenediisocyanate,
2,5-fluorenediisocyanate,
1,8-naphthalenediisocyanate,
2,6-diisocyanatobenzfuran;
4,4′-methylene-bis(phenylisocyanate);
m-phenylenediisocyanate;
and 3,5-dichlorotoluene-2,4-diisocyanate.

Other representative organic diisocyanates are described in U.S. Patents, 2,728,727; 2,847,440; 2,865,940; 2,891,983; 2,963,504; 2,967,193; 2,978,476; 2,986,576 and in the review article by Siefken (ann. 562 110–135 (1949)). Mixtures of 2 or more diisocyanates can be employed when desired.

Organic diisothiocyanates useful in making the polymer of the present invention can be made from any of the diamine precursors of any of the above-described organic diisocyanates by reacting the diamine with carbon bisulfide in the presence of lead nitrate or similar salt that gives an insoluble sulfide. A somewhat similar method is shown in British Patent 495,510. Thiophosgenation of the diamine to the bis(thiocarbamyl chloride) and the decomposition of the latter to the diisothiocyanate is still another general route. Procedures for the transformation of $NH_2$-groups to NCS-groups are given in Organic Syntheses, collective volumes I (pages 165, 447) and III (page 599), John Wiley & Sons, Inc:, New York. Synthetic Organic Chemistry, R. B. Wagner and H. D. Zook, pages 827, 829, John Wiley & Sons, Inc., New York, provides references to further procedures. Arylene diisothiocyanates can be made from any of the above-mentioned arylene diisocyanates by the process of U.S. Patent 2,681,358.

Mixtures of 2 or more diisothiocyanates and mixtures of at least one diisocyanate and at least one diisothiocyanate can be employed.

The NCO- or NCS-terminated polyenamines of the present invention can be used to make adhesives, coating compositions, rigid and resilient foams, crash pads, molded solid articles, fibers, films, calks and coatings. The polyenamines can be used as adhesives for joining steel members. They can be applied directly to fabric, wood, leather, paper and the like or they can be dissolved in volatile liquids (free from Zerewitinoff-active hydrogen atoms or enamine-reactive groups) such as the aliphatic or aromatic hydrocarbons, aliphatic ethers, or aliphatic esters described above and thereafter applied to the desired substrate by conventional methods such as roll coating, swabbing, or spraying. They can be chain-extended with hydrazine to make fibers. They can be added to polyol compositions to cure them to molded solid polyurethane articles, self-supporting films, fibers, and to encapsulate electronic squipment; when blowing agents such as trichloromonofluoromethane, dichlorodifluoromethane, or N,N-dinitrosopentamethylenetetramine are present, cellular articles are obtained—crash pads, resilient cushions, rigid insulation panels, and the like can thus be made.

The enamine-terminated polyenamines will react with isocyanates and isothiocyanates and thus are broadlly useful in making and curing polyisocyanate and polyisothiocyanate compositions. They can be employed to cure liquid NCO-terminated polyalkyleneether (or polyester) polymers for encapsulating electronic equipment and making molded solid articles, fibers, films, calks and coatings; useful cellular products result when gas or a gas-forming agent is incorporated for expanding the mass prior to cure. Solutions containing polyisocyanate compositions and the enamine-terminated polyamides of the present invention can be used for coating applications or preparing self-supporting films.

Since the NCO- or enamine-terminated polyenamines of the present invention have amide groups incorporated therein, they provide a valuable way of building in a controlled degree of amide character into a polyurethane structure to reinforce it. The proportion of amide in the composition can be varied in an empirical fashion. The NCO-terminated polyenamine can be substituted for part or all of the conventional isocyanate compounds present. The enamine-terminated polyenamine can be used in place of part or all of the isocyanate-reactable compounds.

The high molecular weight polyenamines of structure (c) can be press-molded into useful coatings, films, and mechanical parts; they can be melt drawn into filaments.

The character of the product can be varied by those skilled in the art by routine experimentation. In general, the harder, less flexible products will result when the substituents are cyclic, that is, R is cyclic and $Y_2$, $Z_1$, and $Z_2$ are cyclic or part of 5 to 7 membered rings; open-chain structures will tend to be softer, more flexible.

The polyenamines having thioamide groups incorporated therein are very useful as accelerators for curing polychloroprene with magnesia and zinc oxide. Optional additives such as carbon black, detackifiers, antioxidants, and the like can be present. Those skilled in the art wil recognize that the concentrations of curing agents and accelerators and the particular combinations of the optional compounding ingredients used will depend upon the specific application for which the vulcanizate is intended. It has been found advantageous to use enough of the polyenamine to supply about 0.10 to 0.15 part of sulfur for every 100 parts of polychloroprene by weight. A representative recipe contains ( by weight): 100 parts of Type W neoprene, 1 part of N-phenyl-β-naphthylamine, 0.5 part of stearic acid. 29 parts of SRF black, 4 parts of MgO, 6.5 parts of ZnO, and 0.72 part of a polyenamine consisting essentially of repeating units having the formula

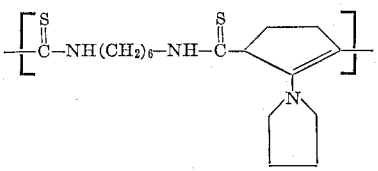

The composition is cured at 153° C. for 30 minutes. Further information about polychloroprene compounding and, in particular, its curing with magnesia and zinc oxide, is to be found in the following publications: The Neoprenes by Neil L. Catton, 1953, Rubber Chemicals Division, E. I. du Pont de Nemours & Co. (Inc.), Wilmington, Delaware; Introduction to Rubber Technology, Ed. by M. Morton, 1959, Reinhold Publishing Corporation; Synthetic Rubber, G. S. Whitby, Editor-in-Chief, 1954, John Wiley & Sons, Inc., New York; Synthetic Rubber Technology, vol. I, W. S. Penn, 1960, Maclaren & Sons, Ltd., London.

The following examples will better illustrate the nature of the present invention; however the invention is not intended to be limited to these examples. Parts are by weight unless otherwise indicated.

*Example 1*

To a solution of 19.5 grams of 4-(1-cyclohexen-1-yl)-2,6-dimethylmorpholine in 125 milliliters of benzene at 25° C. was added with stirring an equimolar amount (17.4 grams) of toluene-2,4-diisocyanate. Since the temperature rose immediately to 35°, external cooling was applied for a few minutes. After being allowed to stand for 26 hours at room temperature, the mixture was filtered. Evaporation of the filtrate left 26.0 grams of a polymer, M.P. about 205° C., insoluble in hot ethyl acetate or $CH_2Cl_2$. It consisted essentially of units having the following structure

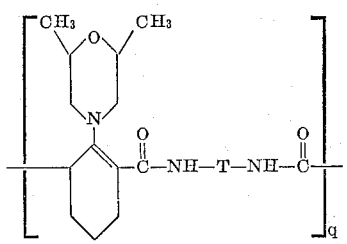

where T is the divalent radical

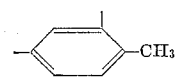

*Analysis.*—Calc. for $C_{21}H_{27}O_3N_3$: C, 68.27; H, 7.37; N, 11.38. Found: C, 65.6, 65.5; H, 7.6, 7.6; N, 11.7, 11.8; inherent viscosity 0.10, 0.09 (0.1% in DMF at 30°).

A 1 gram portion of the polymer was dissolved in 10 milliliters of hot dimethylformamide. The solution was filtered into an aluminum dish and placed in an oven at 127° for 15 hours. A glassy, brittle film resulted.

Example 2

18.1 grams of toluene-2,4-diisocyanate, 17.4 grams of 4-(1-cyclohexen-1-yl) morpholine, and 100 milliliters of benzene were mixed at 25° C. with stirring. The heat of reaction brought the temperature almost to the boiling point. The solution was then refluxed for 16 hours while protected from atmospheric moisture. During this time a solid (36 grams) separated on the walls of the flask. This product was insoluble in hot $CH_2Cl_2$, soluble in hot dimethylformamide, and melted at 203–208°. It consisted essentially of units having the following structure

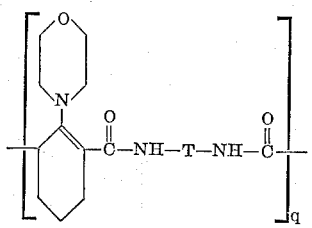

where T is the divalent radical

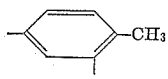

*Analysis.*—Calc. for $C_{19}H_{23}O_3N_3$: C, 66.83; H, 6.79; N, 12.31. Found: 67.6, 67.6; H, 7.3, 7.0; N, 11.6, 11.8; inherent viscosity 0.10, 0.10 (0.1% in DMF at 30°).

A 1-gram portion of the polymer was dissolved in 10 milliliters of hot dimethyl formamide. The solution was filtered into an aluminum dish and placed in an oven at 127° for 15 hours. A glassy, brittle film resulted.

Example 3

After 15.0 grams of hexamethylene diisocyanate, 15.0 grams of 4-(1-cyclohexen-1-yl) morpholine, and 100 milliliters of benzene had been mixed at 25° C., no noticeable heat evolution occurred. The solution was then stirred at reflux for 94 hours while protected from atmospheric moisture. When cooled, the mixture contained two phases. The bottom layer, a thick tacky liquid, was dried in a vaccum desiccator to give a white solid, 17.3 grams, soluble in $CH_2Cl_2$, "stick point" 128°, completely fluid at 182°. It consisted essentially of units having the following structure.

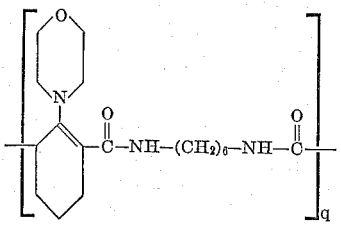

*Analysis.*—Calc. for $C_{18}H_{29}O_3N_3$: C, 64.46; H, 8.72; N, 12.53. Found: C, 64.0, 64.1; H, 8.5, 8.6; N, 11.6, 11.8; inherent viscosity (0.1% by weight solution in DMF at 30° C.): 0.09, 0.10.

Example 4

(A) *Preparation of enamine-terminated polyamide.*— Eight grams (0.054 mole) of 4-(1-cyclohexen-1-yl) morpholine and 4.0 grams (0.0229 mole) of toluene-2,4-diisocyanate were stirred together at 25° C. A very exothermic reaction took place. When cool, the mixture became a glassy brittle resin. This product was an enamine-terminated polyamide having the following structure

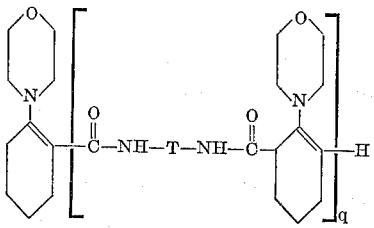

where T is the divalent radical

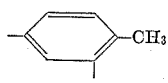

(B) *Preparation of polyisocyanate composition.*—One hundred and thirty grams of polytetramethylene-ether glycol (number-average molecular weight 951) and 60 grams of a toluene diisocyanatae isomer (80% 2,4-, 20% 2,6-) mixture were mixed at 25° C. with vigorous stirring under nitrogen and heated thereafter at 80–82° C. for 70 minutes. The liquid product contained 9.28% NCO-groups by weight.

(C) *Curing polyisocyanate composition with the enamine.*—A 0.4-gram sample of the polyamide prepared in A above was ground in a mortar with 3 grams of Polyisocyanate Composition prepared in B above to form a paste. A 2-day cure at 135° C. yielded an elastomeric slab.

Example 5

(A) Twelve grams (0.072 mole) of 4-(1-cyclohexen-1-yl) morpholine was added with stirring at 25° C. to 25 grams (0.144 mole) of toluene-2,4-diisocyanate. Strong heat evolution occurred and the mixture quickly became too thick to stir. It was then allowed to cool to room temperature over a ½-hour period. The NCO-terminated polyamide obtained, which had the structure

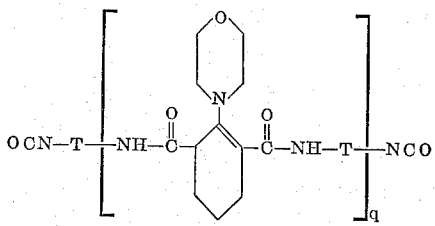

where T is the divalent radical

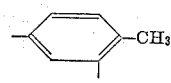

was a brittle solid analyzing for 14.75% NCO (indicating that the average value of $q$ was about 1).

(B) Four grams (0.024 mole) of 4-(1-cyclohexen-1-yl) morpholine was reacted with 16 grams (0.0919 mole) of toluene-2,4-diisocyanate by the procedure of Part A above to obtain a liquid polyisocyanate composition analyzing for 29.7% NCO. A 14.3-gram sample of this composition was mixed with 6.5 grams of polypropyleneether hexol (having a number-average molecular weight of about 680 and made by reacting about 8.59 moles of 1,2-propylene oxide with 1 mole of sorbitol) 0.2 gram of a polydimethyl siloxanepolyether block copolymer (made in accordance with Example I(a) of U.S. Patent 2,834,748), 4 grams of trichloromonofluoromethane, 3 drops of N,N,N',N'-tetramethyl-1,4-butanediamine, and one drop of stannous octoate. Heat was evolved and the mixture expanded to give a very rigid tack-free foam exhibiting an excellent cell structure.

Example 6

To 10 grams (0.0477 mole) of N,N-di-n-butyl-2-cyclohexen-1-ylamine in 125 milliliters of dioxane at 25° C.

was added a solution of 8.3 grams (0.0476 mole) of toluene-2,4-diisocyanate in 25 milliliters of dioxane. The heat of reaction caused slight warming. While protected from atmospheric moisture, the resulting solution was stirred at reflux for one hour and then at 25° C. for 16 hours. Removal of the solvent under reduced pressure gave 8.9 grams of brittle solid (A) and 10 grams of a tacky solid (B). Both (A) and (B) consisted essentially of units having the following structure.

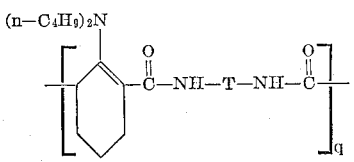

where T is the bivalent radical

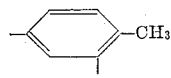

*Analysis.*—Calcd. for $C_{23}H_{33}O_2N_2$: C, 72.03; H, 8.67; N, 10.96. Found: N, 10.55.

The polymer had a melting point of 154–158° C. and a flow point of 190° C.

Sample (B) was dried in a vacuum desiccator. A small portion was then melted on a metal block and drawn at 180° C. into thin filaments which were brittle when cool.

Example 7

To a stirred solution of 5.0 grams of 4-(2-penten-3-yl) morpholine in 20 milliliters of dioxane was added 5.6 grams of a toluene diisocyanate isomer (80% 2,4-, 20% 2,6-) mixture in 5 milliliters of dioxane. The solution became quite warm but quickly cooled. It was then stirred at ambient temperature for 2 days while protected from atmospheric moisture. The solvent was removed by distillation under reduced pressure to leave 12.7 grams of polymer melting at 175–177°; flow point 182° C. It consisted essentially of units having the following structures.

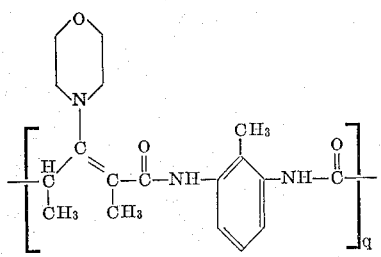

and

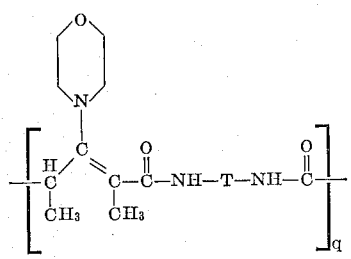

where T is the bivalent radical

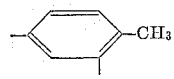

Example 8

A solution of 16.8 grams of hexamethylene diisocyanate in 20 milliliters of dioxane was added fairly rapidly to an agitated solution of 13.7 grams of 1-(1-cyclopenten-1-yl)pyrrolidine in 30 milliliters of dioxane protected from atmospheric moisture and cooled by an ice bath. Immediate turbidity resulted. Precipitation continued as the external cooling was retained. Within a short time the mixture became a solid block moist with solvent. It was dried in a vacuum desiccator for 3 days, then broken up into small pieces. The polymer obtained had a M.P. of 146–150° and a flow point of 161°. It consisted essentially of the following units.

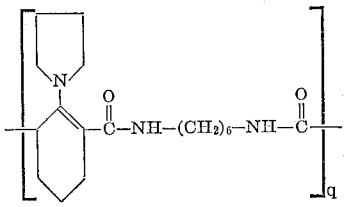

Example 9

(A) *Preparation of NCO-terminated polymers.*—(1) Four grams of 4-(1-cyclohexen-1-yl) morpholine was cooled in an ice bath. Six grams of a toluene diisocyanate isomer (80% 2,4-, 20% 2,6-) mixture was introduced with swirling. The resulting yellow solution was allowed to stand in the ice bath and then at room temperature while it became progressively thicker. A brittle product was obtained having a free NCO-group content of 9.1% by weight.

(2) The procedure of (1) above was repeated using 6 grams of the enamine and 18 grams of the diisocyanate. The brittle product obtained exhibited a free NCO-group content of 13.07%.

(B) *Chain extension of NCO-terminated polymers with polymeric polyols.*—Three grams of polymer (1) were ground together at room temperature with 3.24 grams of polytetramethyleneether (number - average molecular weight 1000) and heated at 100° C. for 16 hours in an aluminum dish. A very viscous tacky polytetramethyleneether polyamide block copolymer was obtained.

Three grams of polymer (2) were ground with 1.06 grams of a polypropyleneether hexol (having a number-average molecular weight of 680 and made by reacting about 8.59 moles of 1,2-propylene oxide with 1 mole of sorbitol) at room temperature. The composition obtained was heated at 100° C. for 16 hours in an aluminum dish. The product polypropyleneether polyamide block copolymer was a hard resin.

As many widely different embodiments of this invention may be made without departing from the spirit and scope thereof, it is to be understood that this invention is not limited to the specific embodiments thereof except as defined in the appended claims.

What is claimed is:

1. A polyenamine selected from the group consisting of (a)

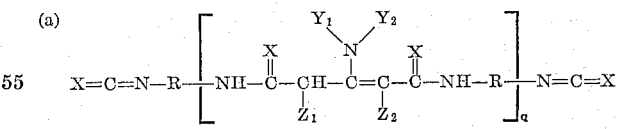

and (b)

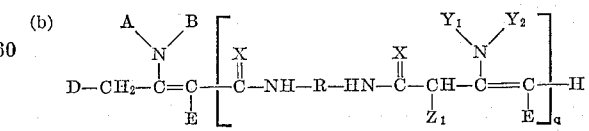

wherein $Y_1$, $Y_2$, $Z_1$, and $Z_2$ are radicals which are inert toward isocyanates and enamines, selected from the group consisting of hydrocarbon and substituted hydrocarbon radicals, said substituents being from the group consisting of nitro, alkoxy, aryloxy, thioalkoxy, and thioaryloxy; R is a bivalent non-polymeric hydrocarbon or substituted hydrocarbon radical which is inert toward isocyanates and enamines, said radicals having a molecular weight less than 500 and said substituents being from the group consisting of alkoxy, aryloxy and halo; q is a positive integer; X is selected from the group consisting of sulfur and oxygen; with the provisos that (1) $Y_1$ is joined to the nitrogen atom bearing $Y_2$ through a carbon atom selected from the group consisting of primary aliphatic and secondary aliphatic carbon atoms; (2) at least one of the pairs $Y_1$–$Y_2$ and $Z_1$–$Z_2$ is joined together to form a 5 to 7 membered ring, said members being selected from the group consisting of carbon atoms and not more than one heteroatom from the group consisting of sulfur, oxygen, and a tertiary nitrogen atom having a hydrocarbon radical attached thereto, and (3) any aliphatic carbon atom joining $Y_2$ to the nitrogen atom bearing $Y_1$ is selected from the group consisting of primary and secondary aliphatic carbon atoms.

2. A polyenamine of claim 1 wherein the radicals $Y_1$, $Y_2$, $Z_1$ and $Z_2$ which are not joined together to form the 5 to 7 membered ring each contain from about 1–18 carbon atoms.

3. A polyenamine of claim 1 wherein R contains not more than about 25 carbon atoms.

4. A polyenamine of claim 3 wherein R is a 2,4-tolylene radical.

5. A polyenamine obtained by reacting toluene-2,4-diisocyanate with 4-(1-cyclohexen-1-yl) morpholine.

6. A polyenamine obtained by reacting toluene-2,4-diisocyanate with 1-(1-cyclopenten-1-yl) pyrrolidine.

7. A process which comprises reacting a compound of the formula $R(NCX)_2$ wherein R is a non-polymeric hydrocarbon or substituted hydrocarbon radical which is inert toward isocyanates and enamines, said radicals having a molecular weight less than 500 and said substituents being from the group consisting of alkoxy, aryloxy and halo and X is from the group consisting of sulfur and oxygen with a monoenamine of the formula

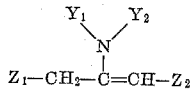

wherein $Y_1$, $Y_2$, $Z_1$, and $Z_2$ are radicals, which are inert toward isocyanates and enamines, selected from the group consisting of hydrocarbon and substituted hydrocarbon radicals, said substituents being from the group consisting of nitro, alkoxy, aryloxy, thioalkoxy, and thioaryloxy; with the provisos that (1) $Y_1$ is joined to the nitrogen atom bearing $Y_2$ through a carbon atom selected from the group consisting of primary aliphatic and secondary aliphatic carbon atoms; (2) at least one of the pairs $Y_1$–$Y_2$ and $Z_1$–$Z_2$ is joined together to form a 5 to 7 membered ring, said members being selected from the group consisting of carbon atoms and not more than one heteroatom from the group consisting of sulfur, oxygen, and a tertiary nitrogen atom having a hydrocarbon radical attached thereto, and (3) any aliphatic carbon atom joining $Y_2$ to the nitrogen atom bearing $Y_1$ is selected from the group consisting of primary and secondary aliphatic carbon atoms.

References Cited by the Examiner
UNITED STATES PATENTS

| | | | |
|---|---|---|---|
| 2,929,800 | 3/1960 | Hill | 260—77.5 |
| 2,944,998 | 7/1960 | Buxbaum | 260—45.8 |
| 3,054,757 | 9/1962 | Britain | 260—2.5 |
| 3,146,219 | 8/1964 | Beitchman | 260—75 |
| 3,182,060 | 5/1965 | Berchtold | 260—247.2 |

OTHER REFERENCES

Journal of Organic Chemistry, vol. 26, August 1961, pages 3043–3044 cited of interest.

LEON J. BERCOVITZ, *Primary Examiner.*

E. McKELVEY, M. C. JACOBS, *Assistant Examiners.*